United States Patent [19]
Yoshida et al.

[11] 3,895,859
[45] July 22, 1975

[54] GLARE-REDUCING WINDOW PANE AND AUTOMOTIVE WINDOW ARRANGEMENT USING THE PANE

[75] Inventors: Fumio Yoshida, Tokyo; Setsuo Sakamoto, Yokohama; Shoichi Tatewaki, Tokyo, all of Japan

[73] Assignees: Nissan Motor Company Limited; Central Glass Company Limited, both of Yokohama, Japan

[22] Filed: Dec. 11, 1973

[21] Appl. No.: 423,753

[30] Foreign Application Priority Data
Dec. 12, 1972 Japan.............................. 47-142000

[52] U.S. Cl............. 350/276 R; 296/146; 350/319
[51] Int. Cl. .............................................. G02b 5/20
[58] Field of Search........ 350/276 R, 268, 277, 283, 350/284, 156; 351/44, 45, 46; 296/97 F, 146

[56] References Cited
UNITED STATES PATENTS
2,187,622  1/1940  Koerner ...................... 350/283 UX
3,544,196  12/1970  Robba ................................ 350/156

FOREIGN PATENTS OR APPLICATIONS
1,934,329  1/1971  Germany .............................. 351/44

*Primary Examiner*—John K. Corbin

[57] ABSTRACT

A sheet of transparent glass with an opaque film attached to an outer perimetrical area of one surface of the sheet of glass and a number of spaced opaque film pieces attached to the remaining area of the surface of the sheet so that it appears intrinsically coloured when viewed from a distance. A typical application of the sheet is in an automotive window assembly.

3 Claims, 9 Drawing Figures

GLARE-REDUCING WINDOW PANE AND AUTOMOTIVE WINDOW ARRANGEMENT USING THE PANE

The invention relates to window assemblies, particularly to assemblies using glare-reducing panes.

Glare-reducing window panes are used to shield off extremely brilliant sunshine and, in some application, to prevent outsiders from looking in through the windows and have generally been made of sheets of coloured glass. Where glare-reducing window panes are used as windshields or as other windows of automotive vehicles, it is desired that the glare-reducing properties of the panes be varied depending upon the individual requirements. This apparently results in increased production costs of the glare-reducing window panes. To avoid this problem, a coloured coating may be applied to the entire surface of a sheet of transparent glass. In this instance, however, another problem is to achieve uniformity in thickness and colour and sufficient durability of the coating.

A window pane has been proposed which has a number of spaced parallel lines of opaque material on one surface of a sheet of transparent glass. Where the window pane of this character is used as the windshield or as another window of an automotive vehicle, slight irregularity or roughness of the lines defining a window frame is accentuated and consequently the external appearance of the vehicle is impaired by the very presence of the opaque lines adjacent the frame. On the other hand, dust particles tend to be deposited on recessed areas at the boundary between the edges of the window frame and the surface of the pane so that, where the pane is incorporated into the window assembly of the automotive vehicle, the opaque parallel lines on the glass show up conspicuously the dust deposits and are thus prone to provide an obstacle to clear viewing from the interior of the vehicle. Since, moreover, the dust particles tend to be deposited deep into the recessed areas, it is difficult to remove the dust from these areas when cleaning the vehicle.

It is, therefore, an important object of the present invention to provide a glare-reducing window pane the glare-reducing property of which is readily varied during production depending upon the requirements of the desired application of the pane.

It is another important object of the invention to provide a glare-reducing window pane having opaque coatings which are uniformly distributed throughout a desired area of a sheet of transparent glass.

Yet, it is another important object of the present invention to provide an automotive window assembly using a glare-reducing pane wherein the irregularity or roughness, if any, of a window frame supporting the pane is completely concealed in the window assembly.

It is still another important object of the invention to provide an automotive window assembly having a glare-reducing pane which is practically free from dust contamination at its boundaries with the window frame.

It is still another important object of the invention to provide an automotive glare-reducing window assembly which is simple in construction and economical to manufacture.

In accordance with the present invention, the window pane comprises a sheet of transparent glass, an opaque film on a perimetrical area of one surface of the sheet of transparent glass, and a number of spaced opaque film pieces on and substantially uniformly distributed throughout the remaining area of the surface of the sheet of transparent glass. The opaque film pieces thus uniformly distributed on the sheet of transparent glass may be in uniformly spaced, substantially straight, or curvilinear form which may be continuous or discontinuous or in the form of uniformly spaced dots.

The automotive window assembly according to the present invention comprises a window frame structure; a window pane supported along its perimetrical edge by the frame structure and comprising a sheet of transparent glass, an opaque film on and along a perimetrical area of the inner surface of the sheet of transparent glass, and a number of spaced opaque film pieces on and substantially uniformly distributed throughout the remaining area of the inner surface of the sheet of transparent glass; and a seal between the adjacent edges of the frame structure and the window pane. The opaque film along the perimetrical area of the sheet of transparent glass may preferably have its inner periphery extending a predetermined distance out from the inner perimetrical edge of the seal so that part of the seal is concealed behind the opaque film when viewed from the outside.

The features of the glare-reducing window pane and the automotive window assembly according to the present invention will become more apparent from the following description taken in conjunction with the accompanying drawings in which like reference numerals designate corresponding parts and structures throughout the figures and in which.

Figure 1:
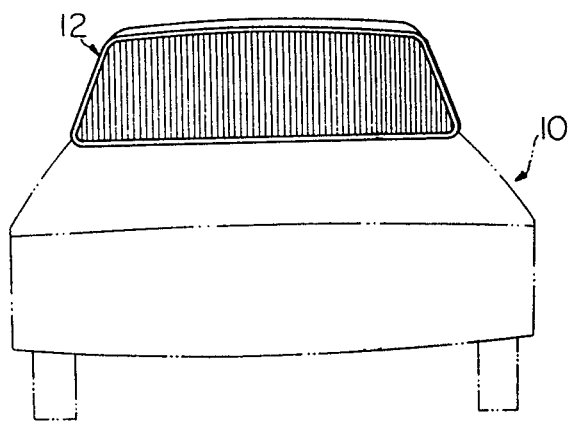
FIG. 1 is an end view of a rear window assembly of an automotive vehicle embodying the present invention.
Figure 3:
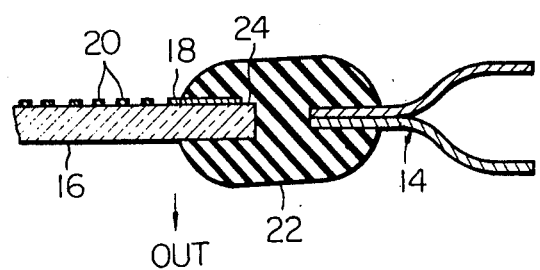
FIG. 3 is a section taken on line III—III of FIG. 2.
Figure 2:
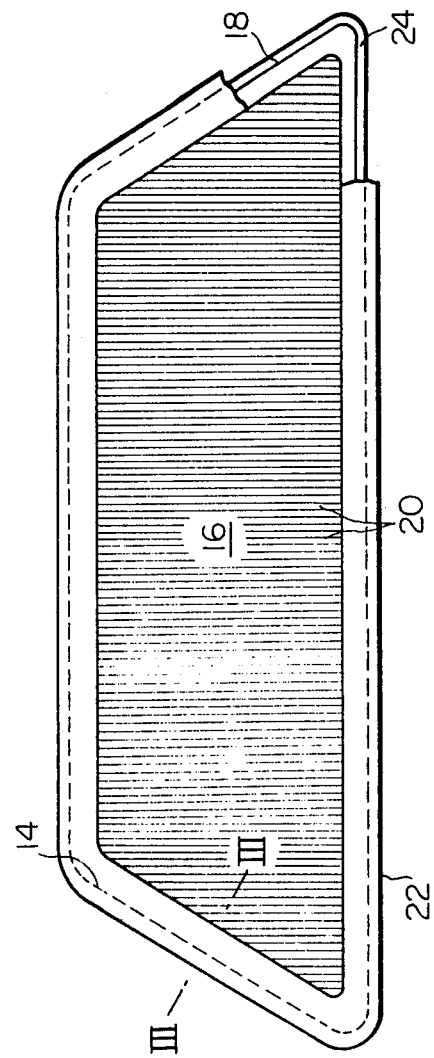
FIG. 2 is a partially cutaway elevation view showing, on an enlarged scale, the rear window assembly illustrated in FIG. 1.
Figure 4:
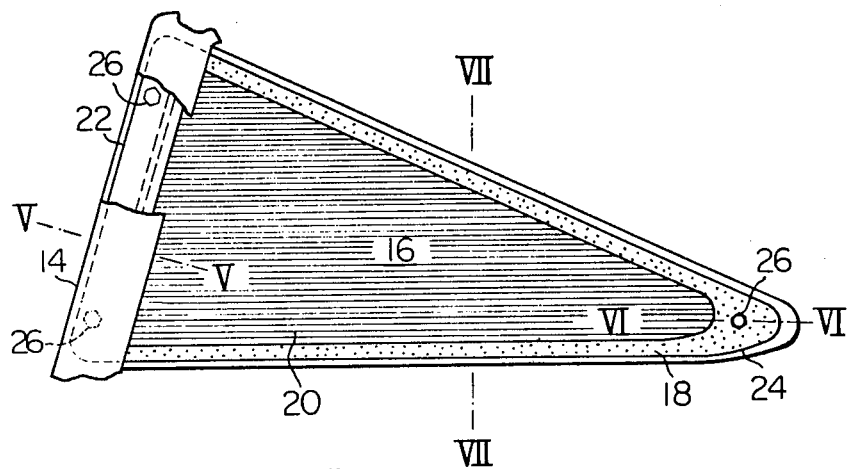
FIG. 4 is a view in elevation, also partially cutaway, of a rear side window assembly of an automotive vehicle embodying the present invention.
Figure 5:
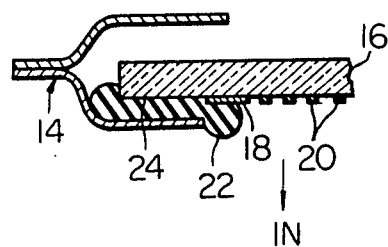
FIGS. 5, 6 and 7 are sections on lines V—V, VI—VI and VII—VII, respectively, of FIG. 4.

Referring to the drawings, first to FIG. 1, a window assembly according to the present invention is shown as applied to the rear window of an automotive vehile which is generally indicated in phantom by reference numeral 10. The rear window assembly, designated in its entirety by reference numeral 12 in FIG. 1, comprises as illustrated in FIGS. 1 and 2, a frame structure 14 forming part of the body of the vehicle and a sheet of transparent glass 16 which is supported along its perimetrical edge by the frame structure 14. The sheet of transparent glass 16 is coated or otherwise provided with an opaque film 18 extending along an entire perimetrical area of the inner surface of the sheet of glass 16 and a plurality of straight, equidistantly spaced, parallel opaque film strips 20 on the remaining area of the inner surface of the sheet of glass 16. The opaque film 18 and strips 20 are of a similar material which may similarly be dark-coloured. In the configuration of FIG. 2, the straight parallel film strips 20 are shown as arranged vertically by way of example but, where desired, the film strips 20 may be arranged horizontally or other directions. The sheet of transparent glass 16 is secured along its entire perimetrical edge to the frame structure 14 by means of a seal or, as often called by those knowing the art, a weather seal strip 22 formed in a loop form of a resilient material such as rubber. As better seen in FIG. 3, the film 18 disposed on the perimetrical area of the sheet of glass 16 preferably has its inner periphery extending from the inner perimetrical edge of the weather seal strip 22 so that the weather strip is completely concealed behind the opaque film 18 when viewed from the outside of the vehicle. For the reasons to be explained later, furthermore, the opaque film 18 has its outer periphery located a predetermined distance short of the perimetrical edge of the sheet of transparent glass 16 so as to provide a continuous uncoated surface area 24 extending along the perimetrical edge of the sheet of glass 16 and surrounding the opaque film 18.

Figure 6:
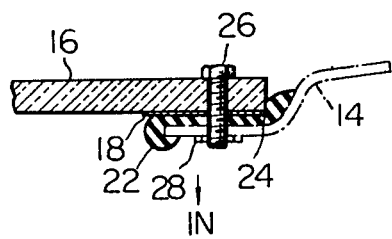
Figure 7:
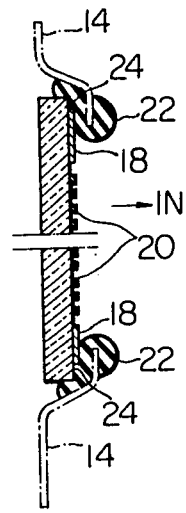

FIGS. 4 to 7 illustrate a glare-reducing window assembly according to the present invention as applied to a rear side window of an automotive vehicle. In the assembly herein shown, the pane with the opaque films 18 and 20 attached to the inner surface of the sheet of transparent glass 16 is secured through the weather seal strip 22 to the window frame structure 14 by bolts 26 and nuts 28, as best seen in FIG. 6. The weather seal strip 22 is thus pressed against the sheet of glass 16 through the opaque film 18 extending along the weather seal strip, the interior portion of which is consequently invisible from the outside of the vehicle. The opaque parallel film strips 20 on the inner surface of the sheet of glass 16 are herein shown as arranged horizontally by way of example.

Figure 8:
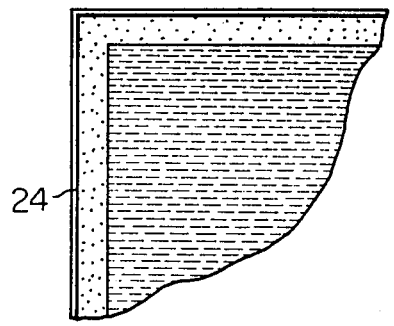
FIG. 8 is a fragmentary elevation view showing a modification of the window panes incorporated into the window assemblies illustrated in FIGS. 2 and 4.
Figure 9:
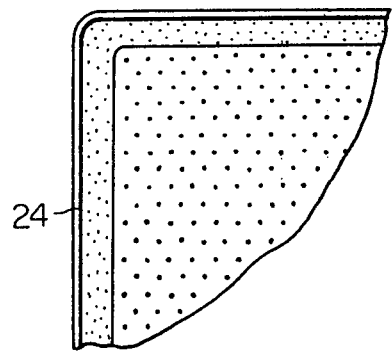
FIG. 9 is a view similar to FIG. 8 but shows another modification of the window panes incorporated into the window assemblies of FIGS. 2 and 4.

The film strips 20 providing the glare-reducing effect in the window assemblies thus far described have been assumed to be in continuous straight form. Such, however, is merely for the purpose of illustration and, where desired, the opaque film strips 20 may be pieces in straight broken or dotted lines as illustrated in FIG. 8 or dots distributed uniformly throughout the area surrounded by the film 18 as seen in FIG. 9. Alternatively, the opaque film strips 20 may be curvilinear which may be continuous or discontinuous, though not shown in the drawings. Where the film strips 20 are straight, and parallel to each other as in the window arrangements shown in FIGS. 2 and 4, it is preferable that they are about 0.5 mm wide and spaced 0.5 mm apart from each other although such is not limitative of the film strips 20 and may therefore be varied depending upon the desired glare-reducing properties of the window panes.

In whichsoever pattern the opaque film strips or pieces 20 may be disposed, they will provide a camouflaged sensation that the window pane per se were intrinsically coloured to a viewer remote from the window, although he will find the clear zones in contrast to the opaque film strips 20 when he stands close to the window.

The opaque film 18 and strips 20 are preferably formed of a material which can be securely attached to the surface of the sheet of transparent glass 16 and which is sufficiently resistant to chemical attacks and to mechanical wear and abrasion. Experiments conducted by the inventors have revealed that a preferred example of such a material is a mixture in the form of a paste of frit consisting of powder of dark-coloured pigment and powder of glass having a relatively low melting point and a binding compound. The material of this nature is commercially available e.g., under the trade name of "S-6090" of Toka Shikiso Chemical Industry Co., Ltd., Japan. The frit is applied to the surface of the sheet of transparent glass in a desired pattern by a silk printing process which is well known in the art and is thereafter fused at an elevated temperature to the sheet of glass.

The glass for use as window panes of automotive vehicles is usually tempered glass which is manufactured by heating glass stock to an elevated temperature and quenching the hot stock rapidly. If, thus, the frit of the above mentioned nature is applied in the desired pattern to the surface of the glass stock prior to heating of the stock, then fusing of the frit will be effected simultaneously as the glass stock is heated. This will be conducive to saving of heat to be consumed and saving production steps.

The cut edge of the sheet of glass is, in effect, a fracture having a lower mechanical strength than the surface of the sheet of glass. Since, however, the sheet of tempered glass is quenched at its cut edge during production, sufficient compressive strength is gained at the cut edge of the sheet of glass. If, thus, an opaque film 18 of the above mentioned frit is disposed along the cut edge on the surface of the sheet of transparent glass 16 which will be tempered, then the temperature will tend to be lower near the cut edge of the sheet of glass due to the presence of the frit film 18 during heating of the glass stock and the edge of the sheet of glass will fail to be adequately quenched. This will be reflected by an insufficient compressive strength of the perimetrical edge of the window pane. Consideration may also be given to the fact that the frit film tends to be unevenly attached to the cut edge face of the sheet of glass so that the glass stock is prone to be unevenly heated and quenched at its cut edge, providing another important cause of the deteriorated mechanical strength of the cut edge face of the window pane. If, furthermore, the frit film is present at the cut edge of the sheet of glass as above mentioned, inconvenience will be experienced in handling and haulage of the glass stock while the frit film remains wet.

These problems can be solved all at one time if the frit film 18 is arranged to have its outer periphery located a distance from the perimetrical edge of the sheet of transparent glass 16 for leaving uncoated the area 24 surrounding the opaque film 18, as previously discussed.

Where, on the other hand, the sheet of transparent glass 16 is secured to the window frame structure 14 by the use of the bolts 26 and nuts 28 as is the case with the window arrangement illustrated in FIGS. 4 to 7, it is preferable that the opaque film 18 of the frit does not cover the vicinity of the holes receiving the bolts 26 for the same reason as the uncoated area 24 is provided.

From the foregoing description, it will now be appreciated that the glare-reducing window pane and the automotive window assembly using such a pane in accordance with the present invention have the following advantages:

1. Ease of accurately controlling the glare-reducing effect of the pane depending upon the individual requirements, because the density and the pattern of the opaque lines or dots can be readily varied during production.

2. The minute roughness of the edges of the frame structure and the weather seal strip is concealed behind the opaque film attached to the perimetrical area of the inner surface of the sheet of transparent glass. The opaque lines or dots adjacent the window frame structure are therefore not perceived as if they were disposed irregularly.

3. Since the light-transmitting area of the window pane is surrounded by the opaque film extending along the perimetrical surface area so that the member of the frame structure located internally of the pane is concealed behind the film, the sheet of glass is exposed to the outside of the window along its area adjacent to the frame structure and is, therefore, free from deposit of dust particles, providing ease of cleaning.

4. Where the opaque frit films are applied to the sheet of tempered glass in such a manner as previously discussed, viz., with the uncoated area left along the perimetrical edge of the sheet of glass, sufficient mechanical strength can be gained at the cut edge of the sheet of glass and at the same time handling the sheet of glass while the frit films still remain wet during production of the pane will be easy.

What is claimed is:

1. In a glare-reducing window assembly, wherein a sheet of transparent glass having on its one surface a number of spaced opaque film pieces is fitted in a window frame encompassing the glass and having a portion lying upon a peripheral area of said one surface of the glass, the combination with said glass and said window frame, of an opaque film strip formed on and extending along said peripheral area of said one surface of the glass, said film strip being so arranged that the film strip extends toward the center of the glass beyond said portion of the window frame whereby the window frame is made invisible by the film strip to a viewer observing the opposite surface of the glass.

2. In a glare-reducing window assembly, wherein a sheet of transparent glass having on its one surface a number of spaced opaque film pieces is fitted in a window frame having a seal member, said seal member having a strip portion extending along and lying upon a peripheral area of said one surface of the glass, the combination with said glass and said seal member, of an opaque film strip formed on and extending along the peripheral area of said one surface of the glass so that the peripheral area of the glass, the film strip and the seal member are laid upon one another in this sequence, said film strip being so arranged that the film strip extends toward the center of the glass beyond the strip portion of the seal member whereby the seal member is made invisible by the film strip to a viewer observing the opposite surface of the glass.

3. A glare-reducing window assembly comprising a sheet of transparent glass having a pair of opposite flat surfaces, a window frame fitting therein the sheet of glass, a weather seal strip secured to the window frame and having a lip portion lying upon a peripheral area of one of said opposite surfaces, an opaque film strip formed on and extending along the peripheral area of said one of the opposite surfaces, said film strip being so arranged that the film strip extends toward the center of the glass beyond the lip portion of said weather strip, and a number of spaced opaque film pieces formed on and substantially uniformly distributed throughout the remaining area of said one of the opposite surfaces.

* * * * *